United States Patent [19]

Andrew et al.

[11] Patent Number: 4,698,325

[45] Date of Patent: Oct. 6, 1987

[54] CATALYSTS FOR AMMONIA SYNTHESIS

[75] Inventors: Sydney P. S. Andrew, Hartlepool; James R. Jennings, Yarm, both of England

[73] Assignee: Imperial Chemical Industries PLC, London, England

[21] Appl. No.: 852,703

[22] Filed: Apr. 16, 1986

[30] Foreign Application Priority Data

Apr. 22, 1985 [GB] United Kingdom ................ 8510197

[51] Int. Cl.$^4$ ........................ B01J 21/04; B01J 21/18; B01J 23/78

[52] U.S. Cl. .................................... 502/330; 502/175; 502/184; 502/313; 502/324; 423/363

[58] Field of Search .............. 502/175, 330, 184, 313, 502/324; 423/362, 363

[56] References Cited

U.S. PATENT DOCUMENTS 1,750,551  3/1930  Uhde .............................. 502/175 X
4,309,311  1/1982  Johnson et al. .................. 502/175 X

FOREIGN PATENT DOCUMENTS 1565074  4/1980  United Kingdom .

OTHER PUBLICATIONS

Rubinshtein et al, Kinetika i Katiliz, 1965 (6), No. (2), pp. 285-293.
Chemical Abstracts 69, 70333 (1968).
Chemical Abstracts 90, 157736a, 157737b, 157738c, 157739d (1979).

*Primary Examiner*—W. J. Shine
*Attorney, Agent, or Firm*—Cushman, Darby & Cushman

[57] ABSTRACT

High surface area, e.g. precipitated, ammonia catalyst precursors are promoted with an alkali metal salt of a transition metal acid, e.g. potassium ferrate, ferrite, permanganate, ruthenate, chromate, or ferrocyanide. The use of such promoters in place of potassium carbonate enables the catalyst to be activated at lower temperatures thus reducing the risk of sintering of the active metal.

10 Claims, No Drawings

CATALYSTS FOR AMMONIA SYNTHESIS

This invention relates to catalysts and in particular to catalysts for ammonia synthesis and to precursors that are reducible, or heat decomposable, to such catalysts.

For ammonia synthesis the catalytically active material is normally iron, optionally in admixture with minor amounts of other metals, e.g. cobalt; or a noble metal from Group VIII of the Periodic Table, such as ruthenium. In order to increase the activity of the catalyst it is normal to incorporate into the precursor an alkali metal compound, particularly a compound of an alkali metal having an atomic number equal to or greater than 19, i.e. potassium, rubidium, or cesium, as an activity promoter. The alkali metal is preferably potassium. For effective activity promotion it is necessary that, in the final catalyst, the alkali metal ions are very well dispersed over the catalytic metal so that they can associate with, or generate, active sites on the catalytic metal.

Iron based catalysts have conventionally been made by reduction of a precursor in the form of fragmented pieces of iron oxide, generally in the form of magnetite, which has been fused with the alkali metal compound and often also with other oxidic materials. In this process the alkali metal has usually been incorporated in the form of potassium carbonate. At the temperatures involved in such a fusion process the alkali metal compound reacts generally forming an alkali metal ferrite.

Iron based catalyst precursors that give catalysts having a greater activity than those obtained by the fusion route can be made from an intimate particulate mixture of iron oxide and a stabilising oxidic material such as alumina. The ultimate particulate mixture, which can be made by simultaneous or sequential precipitation of the oxides or of compounds, such as carbontes of hydroxides, that decompose to the oxides on heating, are then calcined and generally compacted or pelleted prior to reduction to active catalyst. Providing the calcination temperature is not excessive, for example it should not exceed 600° C., precipitated oxide precursors are characterised by a much higher surface are (BET method using nitrogen) than precursors prepared by the fusion route: while the latter generally have a BET surface area below 1 $m^2.g^{-1}$, precipitated oxidic precursors generally have a BET surface area of at least 10 $m^2.g^{-1}$. Upon reduction of the precursor to convert the iron oxide to active metal, such precursors having a high BET surface area give rise to catalysts in which the active metal surface area (as estimated by nitrous oxide decomposition) is significantly higher than in catalysts prepared by the fusion route. Although the high BET surface area precipitated oxidic precursors have a lower density than precursors made by the fusion route, they can give rise to catalysts having a significantly greater activity per unit catalyst bed volume.

Noble metal catalyst precursors having a metal surface area of at least 10, and preferably above 100, $m^2.g^{-1}$ may be prepared from a particulate mixture of a support, e.g. graphite, impregnated with a reducible noble metal compound. Again such particulate mixtures are generally compacted or pelleted prior to use.

The alkali metal compound employed as an activity promoter is generally incorporated into such high surface area precursors by impregnation prior to any pelleting or compaction step. Heretofore the alkali metal has generally been incorporated as the carbonate: however decomposition of the alkali metal carbonate occurs only relatively slowly during the reduction step and so migration of the alkali metal ions to the active sites on the catalytic metal occurs only gradually and continues after the reduction step, i.e. during the ammonia synthesis reaction. Hence full activation of the catalyst is only slowly realised. This is particularly true where the reduction and ammonia synthesis are effected at relatively low temperatures e.g. where noble metal catalysts are employed: low synthesis temperatures are desirable, provided the catalyst has sufficient activity, as they enable the synthesis pressure required to achieve a given equilibrium conversion to be reduced, with consequent compression cost savings. While increasing the reduction temperature results in more rapid activation, the increased temperature is liable to cause sintering of the high surface area active metal and hence result in a lower overall activity.

Impregnation of the precursor material with an alkali metal hydroxide instead of the carbonate offers no significant advantage since the precursor is then liable to absorb carbon dioxide from the atmosphere during pelleting, storage, and/or charging to the ammonia synthesis reactor forming the carbonate with the consequent problems mentioned above.

In the present invention the aforementioned difficulties associated with the use of alkali metal hydroxides or carbonates are avoided by incorporating the alkali metal promotor in the form of an alkali metal salt of a transition metal acid.

Accordingly the present invention provides an ammonia synthesis catalyst precursor having a BET surface area of at least 10 $m^2.g^{-1}$ comprising an intimate mixture of finely divided particles of a reducible compound of at least one metal from Group VIII of the Periodic Table and finely divided particles of carbon and/or at least one stabilising, difficultly reducible, oxidic material, and containing an alkali metal compound as an activity promoter, characterised in that said alkali metal compound is an alkali metal salt of at least one acid containing a metal of Groups V A, VI A, VII A or VIII of the Periodic Table.

The Periodic Table is that published in "Abridgments of Specifications" by the UK Patent Office.

The invention also provides ammonia synthesis catalysts prepared by the reduction of a precursor as aforesaid.

The transition metal of the acid may be for example vanadium, niobium, chromium, molybdenum, tungsten, manganese, rhenium, iron, cobalt, nickel, ruthenium, osmium, or rhodium. Preferred examples of alkali metal compounds include potassium salts of oxyacids, e.g. potassium vanadate, chromite, chromate, dichromate, molybdate, manganate, permanganate, ferrite, ferrate, perferrate, and ruthenate; potassium ferro-, ferri-, or nitrosoferri-, cyanide; and potassium salts of cobalt containing complexes, e.g. cobaltinitrite, cobalticyanide, or cobaltocyanide.

Where the alkali metal salt is readily soluble in water and relatively stable in air, i.e. does not readily absorb carbonate dioxide, as is, for example, the case with molybdates, permanganates, ferrates, chromates, and dichromates, the promoter-containing precursor may be made by impregnating with an aqueous solution of the alkali metal salt, preferably prior to any pelleting or compaction step but after any calcination step.

Where the alkali metal salt has a relatively poor solubility in water, as is the case with potassium ferrite, it may be incorporated as the salt of the corresponding higher oxidation state acid, e.g. as the ferrate, and then reduced to the lower oxidation state in situ: it may be desirable, to avoid transport hazards, to reduce to a lower oxidation state by means of a suitable reducing agent, after incorporation into the precursor, those salts that are powerful oxidising agents, e.g. chromates, permanganates.

Where the alkali metal salt has a relatively poor solubility in water e.g. potassium ferrite and/or has a limited stability in air, it may be incorporated into the precursor in the form of relatively large particles, typically of size 5 to 500 μm, e.g. by mixing with the other particulate components of the precursor prior to a pelleting or compaction step. Such particulate alkali metal salts may be made by fusing the apppropriate transition metal oxide with the oxide, carbonate, or hydroxide of the alkali metal, cooling, and fragmenting, e.g. by milling.

During reduction of the precursor to active catalyst the alkali metal salt is hydrolysed by water produced during the reduction of the active metal compound, and/or reduced, thereby releasing the alkali metal ions which can readily migrate to the catalytic metal active sites.

Where the alkali metal salt is a salt of an acid of a metal that itself has an ammonia synthesis catalytic activity, e.g. molybdenum, iron, ruthenium, it will be apparent that the decomposition of the alkali metal salt will produce a further amount of active metal. Where the alkali metal salt has been added in the form of relatively large particles, the surface area of the active metal produced from decomposition of the alkali metal salt will be relatively low and so this active metal will not significantly affect the overall activity of the catalyst. However if such alkali metal salts are incorporated by impregnation, decomposition of the salts during reduction of the precursor may give finely divided active metal which may give a useful increase in activity.

Generally however the amount of alkali metal salt employed is relatively low so that the additional amount of active metal, if any, produced is insignificant although some useful increase in activity may be obtained where the alkali metal salt is a salt of a noble metal oxyacid, e.g. an osmiate or ruthenate.

Preferred high surface area iron based precursor compositions to which the alkali metal salt is added comprise oxides of iron, aluminium, and optionally small amounts of cobalt and/or an alkaline earth metal such as magnesium. Such compositions are conveniently made by co-precipitation as hydroxides and/or carbonates, followed by calcination at temperatures in the range 200°-500° C. Preferred compositions contain at least 75, particularly 85 to 97.5% by weight of iron oxide (expressed as $Fe_2O_3$), or iron oxide and cobalt oxide (expressed as $Fe_2O_3$ and CoO respectively), and at least 0.5, particularly 2-8% by weight of alumina (expressed as $Al_2O_3$).

The amount of alkali metal compound that should be incorporated will depend on, inter alia, the amount and acidity, if any, of oxidic stabilising material, e.g. alumina, present. Generally the amount of alkali metal compound will be such that there are 0.1 to about 10 alkali metal atoms per 100 atoms of the Group VIII metal.

Reduction and ammonia synthesis may be effected at temperatures above about 320° C., but preferably below 425° C. Preferably the reduction and ammonia synthesis are both effected at temperatures in the range 350°-400° C.

The invention is illustrated by the following Example. In this example a common calcined precipitate of iron, cobalt and aluminium (hydroxy) carbonates was prepared: samples of the calcined precipitate were promoted with differing amounts of various potassium salts.

The precipitate was prepared by adding an aqueous solution containing ferric nitrate, cobalt nitrate, and aluminium nitrate in the requisite proportions at 20° C. to an aqueous solution of sodium carbonate, initially at pH 9, to give a slurry. The proportion of sodium carbonate solution employed was such as to give a terminal pH of 7.5.

The precipitate was collected on a filter, washed until nitrate free, and dried at 120° C. The precipitate was calcined at 400° C. for 6 hours and ground.

Samples of the calcined precipitate were wetted with such an amount of an aqueous solution of the desired potassium salt that complete absorption of the solution occurred. To obtain a range of potassium contents, samples were wetted with a range of solutions of differing concentration of the desired salt.

After wetting the precipitates were dried and pelleted, using about 1% by weight of graphite as a pelleting aid, to form cylinders 8.8 mm diameter and 10 mm long.

The resultant precursor samples were tested by the following procedure:

The sample was crushed to the sieve range 0.6 to 1.0 mm and charged to a laboratory reactor having a catalyst bed 3.2 mm in diameter and 32 mm long. The charge is activated by reduction in a 3:1 hydrogen:nitrogen mixture at 50 bar abs. pressure, raising the temperature to 475° C. over 12 h and holding that temperature for 3 h. The hydrogen:nitrogen gas employed had a total carbon oxides and water content both below 1 ppm by volume.

The conversion of the hydrogen:nitrogen mixture to ammonia was monitored during the reduction stage. This gives an indication of the temperature at which the catalyst showed appreciable activity.

To assess the ammonia synthesis activity after reduction, the temperature was then reduced to 450° C. and the gas mixture flow rate was set at 40000 $cm^3$ of gas per g of catalyst per hour. From percentage conversions measured at this and other space velocities, the "initial" rate constant, per unit catalyst precursor weight, was calculated.

To assess the rate of decline of activity an accelerated ageing procedure was then adopted by increasing the temperature to 550° C. and maintaining that temperature for 6 hours. The temperature was then reduced to 450° C. and the conversion at various flow rates measured. The "final" rate constant, per unit catalyst precursor weight, was then calculated.

The initial and final relative activities are the ratio of the initial and final rate constants, respectively, to the initial rate constant of a standard catalyst.

The standard catalyst employed was that obtained by reduction of a commercial ammonia synthesis catalyst precursor, 35-4 sold by Imperial Chemical Industries plc, and which is a fused mixture of oxides of approximate composition (% w/w):
alumina: 2.5
calcium oxide: 2.0
magnesia: 0.3 silica: 0.4
potassium oxide: 0.8
magnetite: balance.
tested under the above conditions.

For each set of samples using a particular potassium salt as promoter, it was clear that there was an optimum, in terms of initial activity, promoter content. In the following table of results, only the sample closest to the optimum is quoted.

| Sample | Promoter salt | Composition* (by weight) | | | Relative Activity | |
|---|---|---|---|---|---|---|
| | | CoO | Al$_2$O$_3$ | K$_2$O | Initial | Final |
| 1** | K$_2$CO$_3$ | 14.6 | 2.5 | 1.0 | 2.7 | 2.1 |
| 2 | K$_2$RuO$_4$ | 14.6 | 2.5 | 0.5 | 2.1 | 1.5 |
| 3 | K$_2$CrO$_4$ | 14.6 | 2.5 | 0.8 | 2.8 | 2.7 |
| 4 | KMnO$_4$ | 14.6 | 2.5 | 0.7 | 2.8 | 1.7 |
| 5 | K$_4$Fe(CN)$_6$ | 14.6 | 2.5 | 0.9 | 3.1 | NM |
| 6 | K$_3$Fe(CN)$_6$ | 14.6 | 2.5 | 0.9 | 3.2 | NM |
| 7 | K$_2$FeO$_4$+ | 14.6 | 2.5 | 1.1 | 3.1 | NM |

**comparative
*after ignition at 600° C.: Balance is Fe$_2$O$_3$
+calcined precipitate wetted with potassium ferrate dissolved in aqueous ammonia.
NM not measured.

From the % conversion of the nitrogen/hydrogen gas to ammonia measured at various times during the reduction stage for samples 1-6 above and from the temperature profile over the reduction period, the following % conversions at various temperatures were calculated:

| Sample | Promoter salt | Calculated conversion (%) at temperature T (%) | | | | |
|---|---|---|---|---|---|---|
| | | 350 | 375 | 400 | 425 | 450 |
| 1** | K$_2$CO$_3$ | 0.4 | 0.4 | 2.0 | 7.5 | 11.2 |
| 2 | K$_2$RuO$_4$ | 0.7 | 1.6 | 5.0 | 7.9 | 10.2 |
| 3 | K$_2$CrO$_4$ | NM | 1.0 | 3.8 | 7.0 | 9.8 |
| 4 | KMnO$_4$ | 0.7 | 1.6 | 6.1 | 9.5 | 10.7 |
| 5 | K$_4$Fe(CN)$_6$ | 0.7 | 2.0 | 7.7 | 11.2 | 11.8 |
| 6 | K$_3$Fe(CN)$_6$ | NM | 1.6 | 6.1 | 10.2 | 12.0 |

**comparative
NM not measured

It is thus seen that the compositions in accordance with the invention showed significant activity at temperatures below that at which potassium carbonate promoted compositions became active.

We claim:

1. An ammonia synthesis catalyst precursor having a BET surface area of at least 10 m$^2$.g$^{-1}$ comprising an intimate mixture of finely divided particles of a reducible compound of at least one metal from Group VIII of the Periodic Table and finely divided particles of carbon and/or at least one stabilising, difficultly reducible, oxidic material, and containing an alkali metal compound as an activity promoter, characterised in that said alkali metal compound is an alkali metal salt of at least one acid containing a metal of Groups VA, VIA, VIIA or VIII of the Periodic Table.

2. A precursor according to claim 1 wherein the alkali metal of the alkali metal salt has an atomic number greater than, or equal, to 19.

3. A precursor according to claim 1 wherein the alkali metal salt is a salt of an acid containing vanadium, niobium, chromium, molybdenum, tungsten, manganese, rhenium, iron, ruthenium, osmium, or rhodium.

4. A precursor according to claim 3 wherein the alkali metal salt is potassium vanadate, chromite, dichromate, molybdate, manganate, permanganate, ferrite, ferrate, ruthenate, ferrocyanide, or ferricyanide.

5. A precursor according to claim 1 containing at least 75% by weight of iron, or iron and cobalt, oxides (expressed as Fe$_2$O$_3$ and CoO respectively) and at least 0.5% by weight of alumina (expressed as Al$_2$O$_3$).

6. A precursor according to claim 1 wherein there are 0.1 to 10 alkali metal atoms per 100 Group VIII metal atoms.

7. A process for the production of an ammonia synthesis catalyst precursor comprising impregnating an intimate mixture of finely divided particles of a reducible compound of at least one metal from Group VIII of the Periodic Table and finely divided particles of carbon and/or at least one stabilising, difficultly reducible, oxidic material and having a BET surface area of at least 10 m$^2$.g$^{-1}$ with an aqueous solution containing an alkali metal salt of at least one acid containing a metal of Groups VA, VIA, VIIA or VIII of the Periodic Table.

8. A process according to claim 7 wherein, after impregnation, the alkali metal salt is reduced to a salt of a lower oxidation state acid.

9. A process for the production of an ammonia synthesis catalyst precursor comprising mixing an intimate mixture of finely divided particles of a reducible compound of at least one metal from Group VIII of the Periodic Table and finely divided particles of carbon and/or at least one stabilising, difficultly reducible, oxidic material and having a BET surface area of at least 10 m$^2$.g$^{-1}$ with particles of an alkali metal salt of at least one acid containing a metal of Groups VA, VIA, VIIIA or VIII of the Periodic Table and having a size of 5 to 500 μm.

10. A process according to claim 9 wherein the alkali metal salt is potassium ferrite.

* * * * *